(12) United States Patent
Martino et al.

(10) Patent No.: US 11,876,926 B2
(45) Date of Patent: Jan. 16, 2024

(54) PROVIDING AUDIO CONTENT TO A DEVICE

(71) Applicant: FIRST ORION CORP., North Little Rock, AR (US)

(72) Inventors: Monica Rose Martino, Plano, TX (US); Kevin V. Nguyen, Allen, TX (US); M. Gregory Smith, Fairview, TX (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

(21) Appl. No.: 18/152,728

(22) Filed: Jan. 10, 2023

(65) Prior Publication Data
US 2023/0164263 A1 May 25, 2023

Related U.S. Application Data

(63) Continuation of application No. 17/210,403, filed on Mar. 23, 2021, now Pat. No. 11,553,081, which is a continuation of application No. 13/887,810, filed on May 6, 2013, now Pat. No. 10,958,781, which is a continuation-in-part of application No. 12/890,829, (Continued)

(51) Int. Cl.
| H04M 3/42 | (2006.01) |
|---|---|
| H04M 1/64 | (2006.01) |
| H04M 1/57 | (2006.01) |
| H04L 67/306 | (2022.01) |

(Continued)

(52) U.S. Cl.
CPC ...... *H04M 3/42059* (2013.01); *H04L 67/306* (2013.01); *H04M 1/578* (2013.01); *H04M 1/642* (2013.01); *H04M 1/72403* (2021.01); *H04M 3/4878* (2013.01); *H04M 2250/02* (2013.01)

(58) Field of Classification Search
CPC ...... H04M 3/42; H04M 3/493; H04M 3/4872; H04M 3/42348; H04M 3/4878; G06Q 30/0255; G06Q 30/0269; G06Q 30/0267; G06Q 20/1235; G06Q 20/123; G06Q 20/18; G06F 17/30867; G06F 17/30905; G06F 17/30017; G06F 17/30058; G06F 3/0488; G06F 17/30749; G06F 17/30902; G06F 3/0482; G06F 3/04842; H04N 21/41407; H04N 21/47217; H04N 21/47202; H04N 21/482; H04N 21/6125; H04N 7/17318; H04N 21/2743; H04N 21/4126; H04N 21/2225; H04N 21/2387; H04N 21/2393; H04N 21/2668; H04N 21/4332; H04N 21/4622; H04N 21/47214; H04N 21/478; H04N 21/6131; H04N 21/6581; H04N 21/812
USPC ............... 370/352, 353, 354, 355, 356, 357; 379/373, 374; 455/404.1, 404.2, 414, 455/3.06
See application file for complete search history.

(56) References Cited

U.S. PATENT DOCUMENTS

| 672,146 | A | 4/1901 | Collis |
|---|---|---|---|
| 5,165,095 | A | 11/1992 | Borcherding |

(Continued)

*Primary Examiner* — Kharye Pope

(57) ABSTRACT

The present disclosure describes receiving a trigger operation indication that content has been selected by a user device, and determining whether the content offers a recurring audio content data. The operation may also include retrieving a first audio content and transmitting the first audio content to the user device.

20 Claims, 9 Drawing Sheets

Related U.S. Application Data filed on Sep. 27, 2010, now Pat. No. 8,548,140, which is a continuation of application No. 11/974,983, filed on Oct. 17, 2007, now Pat. No. 8,625,762.

(60) Provisional application No. 60/934,407, filed on Jun. 13, 2007.

(51) Int. Cl.
*H04M 3/487* (2006.01)
*H04M 1/72403* (2021.01)

(56) References Cited

U.S. PATENT DOCUMENTS

| | | |
|---|---|---|
| 5,311,569 A | 5/1994 | Brozovich et al. |
| 5,651,055 A | 7/1997 | Argade |
| 5,883,943 A | 3/1999 | Siddiqui |
| 5,940,484 A | 8/1999 | DeFazio et al. |
| 5,970,143 A | 10/1999 | Schneier et al. |
| 6,014,426 A | 1/2000 | Drysdale et al. |
| 6,055,505 A | 4/2000 | Elston |
| 6,240,175 B1 | 5/2001 | Barber |
| 6,298,128 B1 | 10/2001 | Ramey et al. |
| 6,341,161 B1 | 1/2002 | Latter et al. |
| 6,353,664 B1 | 3/2002 | Cannon et al. |
| 6,449,351 B1 | 9/2002 | Moss et al. |
| 6,459,782 B1 | 10/2002 | Bedrosian et al. |
| 6,493,427 B1 | 12/2002 | Kobylevsky et al. |
| 6,496,569 B2 | 12/2002 | Pelletier et al. |
| 6,539,080 B1 | 3/2003 | Bruce et al. |
| 6,608,886 B1 | 8/2003 | Contractor |
| 6,658,455 B1 | 12/2003 | Weinman |
| 6,721,406 B1 | 4/2004 | Contractor |
| 6,829,233 B1 | 12/2004 | Gilboy |
| 6,920,206 B2 | 7/2005 | Basore et al. |
| 6,940,954 B1 | 9/2005 | Toebes |
| 6,950,504 B1 | 9/2005 | Marx et al. |
| 6,970,543 B2 | 11/2005 | Lautenschlager et al. |
| 7,024,556 B1 | 4/2006 | Hadjinikitas et al. |
| 7,127,237 B2 | 10/2006 | Naruse et al. |
| 7,200,212 B2 | 4/2007 | Gosselin |
| 7,248,677 B2 | 7/2007 | Randall et al. |
| 7,269,413 B2 | 9/2007 | Kraft |
| 7,840,689 B2 | 11/2010 | Stewart |
| 7,864,940 B1 | 1/2011 | Harvey et al. |
| 7,869,792 B1 | 1/2011 | Zhou et al. |
| 7,899,921 B2 | 3/2011 | Hill et al. |
| 8,005,195 B2 | 8/2011 | Luneau et al. |
| 8,068,825 B2 | 11/2011 | Mikan et al. |
| 8,081,992 B2 | 12/2011 | Book |
| 8,095,647 B2 | 1/2012 | Stewart |
| 8,099,780 B2 | 1/2012 | Lu |
| 8,103,868 B2 | 1/2012 | Christensen |
| 8,199,733 B2 | 6/2012 | Stewart |
| 8,250,204 B2 | 8/2012 | Stewart |
| 8,255,539 B2 | 8/2012 | Pierlot et al. |
| 8,280,020 B2 | 10/2012 | Vinokurov et al. |
| 8,295,819 B1 | 10/2012 | Kaplan et al. |
| 8,300,787 B2 | 10/2012 | Frank |
| 8,331,899 B2 | 12/2012 | Broms |
| 8,417,763 B2 | 4/2013 | Stewart |
| 8,437,460 B2 | 5/2013 | Daniell et al. |
| 8,447,018 B2 | 5/2013 | Martino et al. |
| 8,548,140 B2 | 10/2013 | Martino et al. |
| 8,625,762 B1 | 1/2014 | White et al. |
| 8,861,697 B2 | 10/2014 | Martino et al. |
| 8,879,702 B1 | 11/2014 | White et al. |
| 9,008,292 B2 | 4/2015 | Martino et al. |
| 9,036,797 B2 | 5/2015 | Martino et al. |
| 9,106,743 B2 | 8/2015 | White et al. |
| 9,197,740 B2 | 11/2015 | White et al. |
| 9,350,855 B2 | 5/2016 | White et al. |
| 9,392,107 B2 | 7/2016 | Martino et al. |
| 9,496,569 B2 | 11/2016 | Gangwar |
| 9,497,306 B2 | 11/2016 | Martino et al. |
| 9,674,346 B2 | 6/2017 | White et al. |
| 9,838,535 B2 | 12/2017 | Martino et al. |
| 10,091,342 B2 | 10/2018 | Martino et al. |
| 10,148,813 B2 | 12/2018 | White et al. |
| 10,257,348 B2 | 4/2019 | White et al. |
| 10,262,281 B1 | 4/2019 | Vitek et al. |
| 10,397,387 B2 | 8/2019 | Martino et al. |
| 10,455,083 B2 | 10/2019 | White et al. |
| 10,805,446 B2 | 10/2020 | Martino et al. |
| 10,819,846 B2 | 10/2020 | White et al. |
| 11,102,346 B2 | 8/2021 | White et al. |
| 2002/0018546 A1 | 2/2002 | Horne |
| 2002/0057764 A1 | 5/2002 | Salvucci et al. |
| 2002/0067807 A1 | 6/2002 | Danner et al. |
| 2002/0120505 A1 | 8/2002 | Henkin et al. |
| 2002/0169670 A1 | 11/2002 | Barsade et al. |
| 2002/0172336 A1 | 11/2002 | Postma et al. |
| 2003/0027559 A1 | 2/2003 | Umstetter et al. |
| 2003/0086558 A1 | 5/2003 | Seelig et al. |
| 2003/0088677 A1 | 5/2003 | Yamamoto |
| 2003/0112938 A1 | 6/2003 | Kanakubo et al. |
| 2003/0128821 A1 | 7/2003 | Uneau et al. |
| 2003/0130887 A1 | 7/2003 | Nathaniel |
| 2003/0130894 A1 | 7/2003 | Huettner et al. |
| 2003/0144876 A1 | 7/2003 | Kosinski et al. |
| 2003/0177347 A1 | 9/2003 | Schneier et al. |
| 2003/0198323 A1 | 10/2003 | Watanabe |
| 2004/0013409 A1* | 1/2004 | Beach ............... H04N 21/4348 386/355 |
| 2004/0044912 A1 | 3/2004 | Connary et al. |
| 2004/0067751 A1 | 4/2004 | Vandermeijden et al. |
| 2004/0078807 A1 | 4/2004 | Fries et al. |
| 2004/0096042 A1 | 5/2004 | Orwick et al. |
| 2004/0148342 A1 | 7/2004 | Cotte |
| 2004/0174966 A1 | 9/2004 | Koch |
| 2004/0223605 A1 | 11/2004 | Donnelly |
| 2004/0228456 A1 | 11/2004 | Glynn et al. |
| 2004/0261126 A1 | 12/2004 | Addington et al. |
| 2005/0008085 A1 | 1/2005 | Lee et al. |
| 2005/0021397 A1 | 1/2005 | Cui et al. |
| 2005/0074109 A1 | 4/2005 | Hanson et al. |
| 2005/0084085 A1 | 4/2005 | Silver et al. |
| 2005/0160144 A1 | 7/2005 | Bhatia |
| 2005/0172154 A1 | 8/2005 | Short et al. |
| 2005/0182675 A1 | 8/2005 | Huettner |
| 2005/0197164 A1 | 9/2005 | Chan |
| 2005/0198099 A1 | 9/2005 | Motsinger et al. |
| 2005/0240432 A1 | 10/2005 | Jensen |
| 2005/0243975 A1 | 11/2005 | Reich et al. |
| 2005/0246732 A1 | 11/2005 | Dudkiewicz et al. |
| 2005/0286687 A1 | 12/2005 | Sanmugasuntharam et al. |
| 2005/0286691 A1 | 12/2005 | Taylor et al. |
| 2006/0025112 A1 | 2/2006 | Hamanaga et al. |
| 2006/0026277 A1 | 2/2006 | Sutcliffe |
| 2006/0031553 A1 | 2/2006 | Kim |
| 2006/0072713 A1 | 4/2006 | Fernandes et al. |
| 2006/0085519 A1 | 4/2006 | Goode et al. |
| 2006/0122894 A1 | 6/2006 | McGary et al. |
| 2006/0123119 A1 | 6/2006 | Hill et al. |
| 2006/0166658 A1 | 7/2006 | Bennett et al. |
| 2006/0184684 A1 | 8/2006 | Weiss et al. |
| 2006/0223494 A1 | 10/2006 | Chmaytelli et al. |
| 2006/0248209 A1* | 11/2006 | Chiu ................ G06Q 30/02 709/231 |
| 2006/0293057 A1 | 12/2006 | Mazerski et al. |
| 2006/0294465 A1 | 12/2006 | Ronen et al. |
| 2007/0010235 A1 | 1/2007 | Moyes |
| 2007/0033419 A1 | 2/2007 | Kocher et al. |
| 2007/0050372 A1 | 3/2007 | Boyle |
| 2007/0064886 A1 | 3/2007 | Chiu et al. |
| 2007/0071201 A1 | 3/2007 | Pettus et al. |
| 2007/0094082 A1* | 4/2007 | Yruski ............... G06Q 30/0277 705/14.56 |
| 2007/0094398 A1* | 4/2007 | Chou ................. H04L 67/06 709/227 |
| 2007/0102527 A1 | 5/2007 | Eubank et al. |
| 2007/0127650 A1 | 6/2007 | Altberg et al. |
| 2007/0127656 A1 | 6/2007 | Citron et al. |
| 2007/0133771 A1 | 6/2007 | Stifelman et al. |

(56) References Cited

U.S. PATENT DOCUMENTS

| | | |
|---|---|---|
| 2007/0154009 A1 | 7/2007 | Cameron et al. |
| 2007/0195942 A1 | 8/2007 | Woodring |
| 2007/0206736 A1 | 9/2007 | Sprigg et al. |
| 2007/0207781 A1 | 9/2007 | Sprigg et al. |
| 2007/0248221 A1 | 10/2007 | Chatterjee et al. |
| 2007/0271596 A1 | 11/2007 | Boubion et al. |
| 2007/0280445 A1 | 12/2007 | Shkedi |
| 2008/0005325 A1 | 1/2008 | Wynn et al. |
| 2008/0070609 A1 | 3/2008 | Ackley |
| 2008/0084975 A1 | 4/2008 | Schwartz |
| 2008/0089501 A1 | 4/2008 | Benco et al. |
| 2008/0091796 A1* | 4/2008 | Story ............... G06F 3/04842 709/217 |
| 2008/0101298 A1 | 5/2008 | Tasker |
| 2008/0140714 A1 | 6/2008 | Rhoads et al. |
| 2008/0159318 A1 | 7/2008 | Pierlot et al. |
| 2008/0177616 A1 | 7/2008 | Nemirofsky et al. |
| 2008/0240383 A1 | 10/2008 | Fronczak et al. |
| 2008/0246605 A1 | 10/2008 | Pfeffer et al. |
| 2008/0249986 A1* | 10/2008 | Clarke-Martin ...... G06Q 30/02 |
| 2008/0260135 A1 | 10/2008 | Siegrist |
| 2009/0041206 A1 | 2/2009 | Hobby et al. |
| 2009/0177303 A1 | 7/2009 | Logan et al. |
| 2009/0234578 A1 | 9/2009 | Newby et al. |
| 2009/0258595 A1 | 10/2009 | Gielow et al. |
| 2010/0042592 A1 | 2/2010 | Stolz et al. |
| 2010/0088715 A1 | 4/2010 | Sloo |
| 2010/0125500 A1 | 5/2010 | Beavers et al. |
| 2010/0159909 A1 | 6/2010 | Stifelman |
| 2011/0007885 A1 | 1/2011 | Kirchhoff et al. |
| 2011/0013501 A1 | 1/2011 | Curtis |
| 2011/0013755 A1 | 1/2011 | Martino et al. |
| 2011/0045761 A1 | 2/2011 | Rolf et al. |
| 2011/0082752 A1 | 4/2011 | Dube et al. |
| 2011/0087744 A1 | 4/2011 | Deluca et al. |
| 2011/0105091 A1 | 5/2011 | Jones |
| 2011/0179453 A1 | 7/2011 | Poniatowski |
| 2011/0320066 A1 | 12/2011 | Schofield et al. |
| 2012/0003955 A1 | 1/2012 | Gabriel |
| 2012/0078707 A1* | 3/2012 | Ramakrishnan ........ H04L 65/80 705/14.41 |
| 2012/0123862 A1 | 5/2012 | Kurra et al. |
| 2012/0158472 A1 | 6/2012 | Singh et al. |
| 2012/0158504 A1 | 6/2012 | Kumar et al. |
| 2012/0226756 A1* | 9/2012 | Lindquist ........... H04N 21/4432 709/204 |
| 2012/0230479 A1 | 9/2012 | Martin |
| 2012/0243675 A1 | 9/2012 | Diroo et al. |
| 2012/0324504 A1 | 12/2012 | Archer et al. |
| 2013/0115927 A1 | 5/2013 | Gruber et al. |
| 2013/0325606 A1 | 12/2013 | Balduf et al. |
| 2013/0332288 A1 | 12/2013 | Garmon et al. |
| 2014/0003589 A1 | 1/2014 | Martino et al. |
| 2014/0006161 A1* | 1/2014 | Jabara ................ G07F 17/3223 705/14.57 |
| 2014/0122506 A1 | 5/2014 | Jebara et al. |
| 2014/0180818 A1* | 6/2014 | Mistler ............. G06Q 30/0259 705/14.57 |
| 2014/0282759 A1* | 9/2014 | Harvey ............. H04N 21/4668 725/89 |
| 2014/0330649 A1* | 11/2014 | Lyren .................... G06Q 50/01 705/14.66 |
| 2014/0351147 A1* | 11/2014 | Castrechini ......... G06Q 20/382 705/79 |

\* cited by examiner

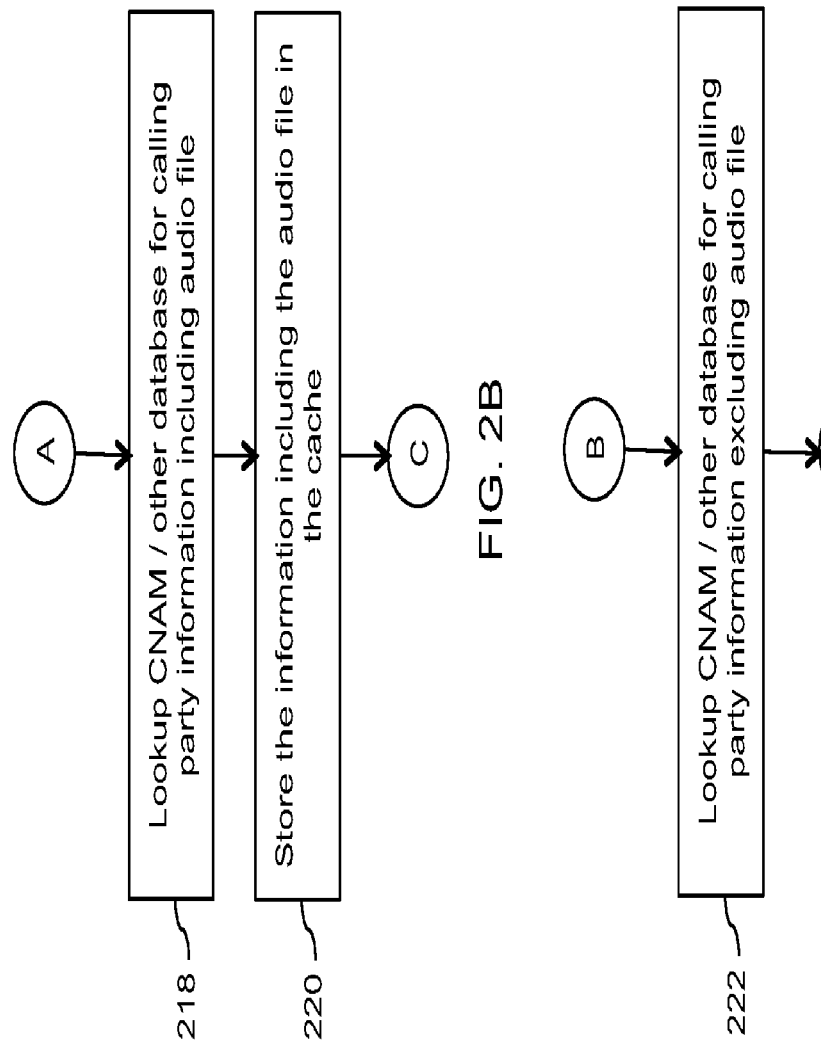

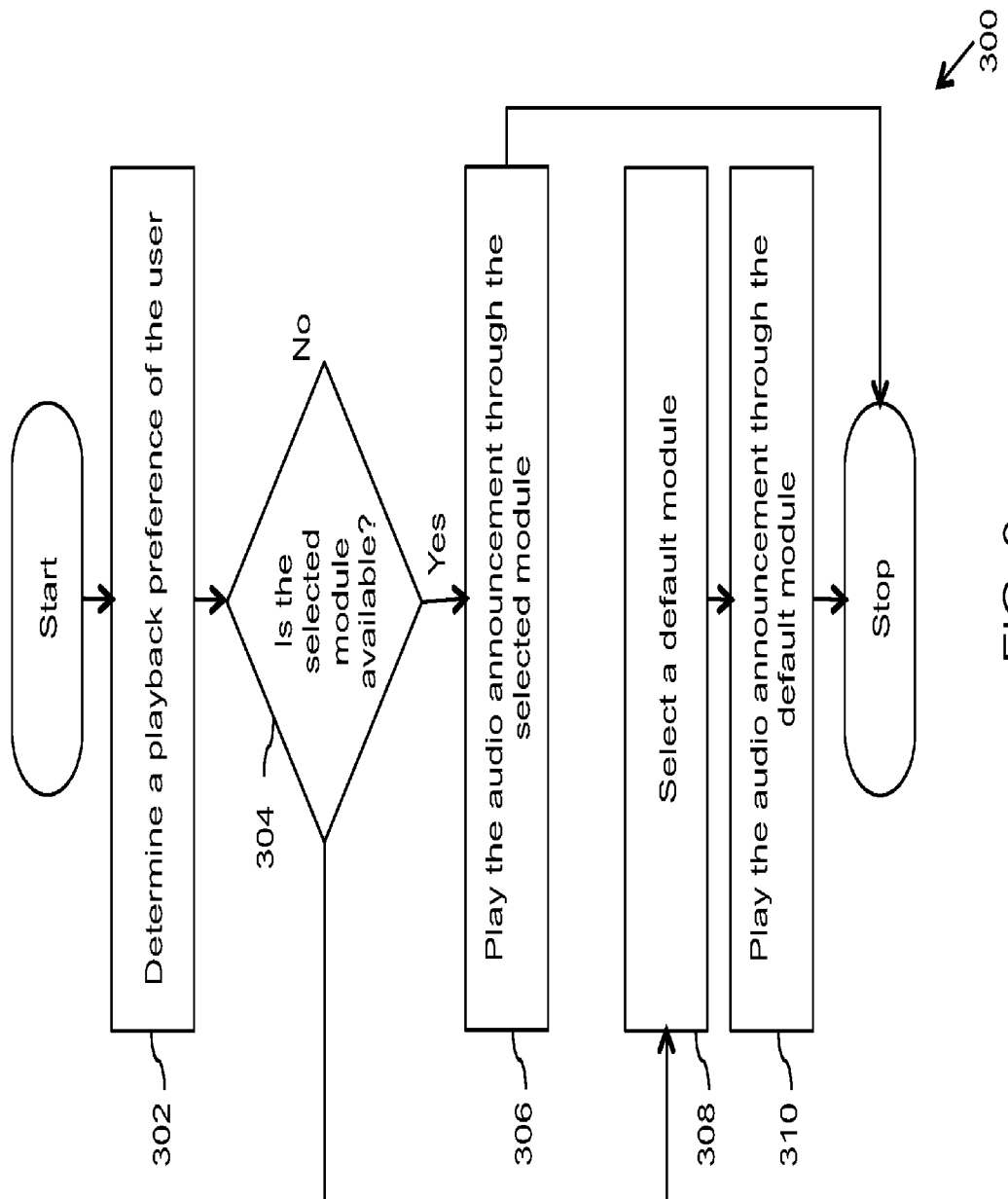

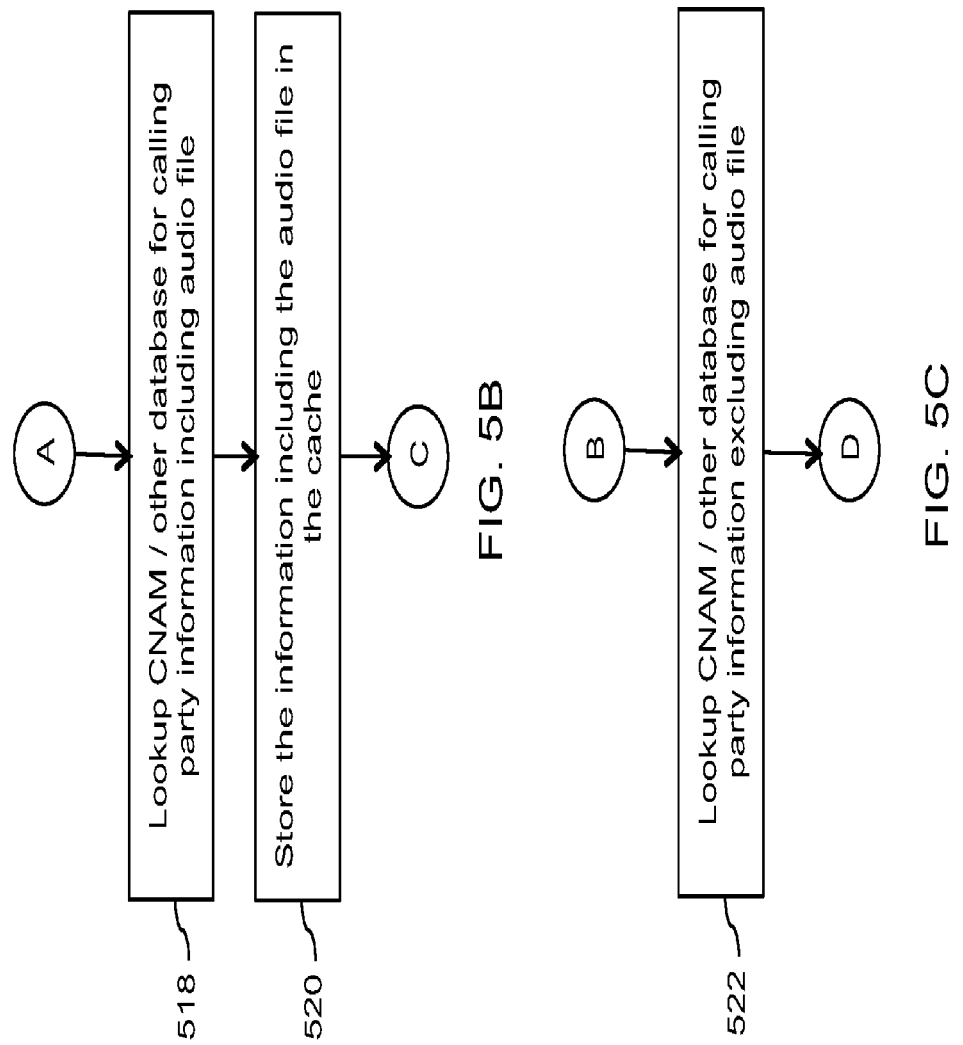

PROVIDING AUDIO CONTENT TO A DEVICE

CROSS REFERENCE TO RELATED APPLICATIONS

This application is a Continuation of U.S. Non-Provisional application Ser. No. 17/210,403, filed on Mar. 23, 2021, which is a Continuation of U.S. Non-Provisional application Ser. No. 13/887,810, filed on May 6, 2013, which is a Continuation-In-Part of U.S. Non-Provisional application Ser. No. 12/890,829, filed on Sep. 27, 2010 which is a Continuation-In-Part of U.S. Non-Provisional application Ser. No. 11/974,983, filed on Oct. 17, 2007, which is a non-provisional of U.S. Provisional application Ser. No. 60/934,407, filed on Jun. 13, 2007, the entire disclosures of which are incorporated herein by reference.

FIELD

The present disclosure is generally related to a communications network, and more particularly to a system, method, and non-transitory computer readable medium for providing audio announcement to content selections.

BACKGROUND

Automatic Number Identification (ANI) is a system utilized by telephone companies to identify the Directory Number (DN) of a calling subscriber. ANI serves a function similar to Caller ID, but may utilize different underlying technology. It is possible that the Caller ID can be blocked by prefixing a call with *67. ANI was originally developed for telephone company billing purposes and is now offered to commercial customers who may benefit from knowing who is calling them. In addition, ANI is one of the core technologies behind the 911 emergency services.

In commercial applications, a user may have an integrated or extraneous display affixed to a telephone. Such a display presents the ANI or telephone number of the calling party. In addition, the display may present the caller's name or calling name, also known as CNAM. Similarly, in case of a Short Messaging Service (SMS), the display may present a sender's name. However, the user may prefer to hear the audio of the information rather then watching the display. As such, audio may be provided to a user device based on certain content selection operations and corresponding settings.

SUMMARY

The present disclosure describes a system, method, and non-transitory computer-readable storage medium storing instructions that when executed cause a processor to perform providing audio announcement of communications to a called party in a communication network. In one embodiment, a method includes receiving communication from a calling party and performing a lookup of information relating to the calling party in a database via an Internet Protocol connection based on an identifier of at least one of the calling party and the called party. The information comprises one or more audio files. The audio announcement is then provided to a called party based on the audio files.

In another embodiment, a system comprises at least one device for receiving communication from a calling party. The system comprising at least one database for storing information associated with the calling party. The at least one device is operable to perform a lookup of information relating to the calling party in a database via an Internet Protocol connection based on an identifier of at least one of the calling party and the called party, wherein the information comprises one or more audio files, and provide an audio announcement to a called party based on the audio files.

In a further embodiment, a computer-readable medium comprises instructions executable by a device for receiving communication from a calling party, performing a lookup of information relating to the calling party in a database via an Internet Protocol connection based on an identifier of at least one of the calling party and the called party, wherein the information comprises one or more audio files, and providing an audio announcement to a called party based on the audio files.

In another embodiment, a method comprises providing an audio content to a user device comprises receiving a trigger operation indication that a content source has been selected by a user device, determining whether the content source offers recurring audio content data, retrieving a first audio content and transmitting the first audio content to the user device, retrieving user preferences for receiving the recurring audio content data, and transmitting additional audio content that is different from the first audio content to the user device based on the user preferences.

In a further embodiment a method comprises receiving a trigger operation indication that content has been selected by a user device, determining whether the content offers a recurring audio content data, and retrieving a first audio content and transmitting the first audio content to the user device.

In another embodiment, an apparatus comprises a receiver configured to receive a trigger operation indication that a content source has been selected, and a processor configured to determine whether the content source offers a recurring audio content data, retrieve a first audio content and transmitting the first audio content, retrieve user preferences for receiving the recurring audio content data, and a transmitter configured to transmit additional audio content that is different from the first audio content based on the user preferences.

In a further embodiment, an apparatus comprises a receiver configured to receive a trigger operation indication that content has been selected and a processor configured to: determine whether the content offers a recurring audio content data, and retrieve a first audio content and transmit the first audio content. The term apparatus can also refer to a system herein where the receiver and processor are not co-located.

In another embodiment, a non-transitory computer readable storage medium stores instructions that when executed cause a processor to perform: receiving a trigger operation indication that content has been selected by a user device, determining whether the content offers a recurring audio content data, and retrieving a first audio content and transmitting the first audio content to the user device.

BRIEF DESCRIPTION OF DRAWINGS

FIGS. 2A, 2B and 2C depict a flowchart of a method or computer readable medium comprising instructions for providing audio announcement of communications to a called party in accordance with one embodiment of the present disclosure; and FIG. 3 depicts a flowchart of a process (which includes a method or computer readable medium comprising instructions) is depicted for playing audio announcement based on playback preference in accordance with an embodiment of the present disclosure;

FIGS. 5A, 5B and 5C depict a flowchart of a method or computer readable medium comprising instructions for providing audio announcement of communications to a wireless called party in accordance with one embodiment of the present disclosure.

DETAILED DESCRIPTION

The present disclosure provides audio announcement of communications to a called party. In the context of the present disclosure, a calling party is a party initiating or sending a call or a message. A called party is a party receiving the call or the message. Such a process is initiated when a calling party contacts or communicates a called party wherein the calling party and the called party each use at least one electronic device and the called party is able to receive ANI or Caller ID service and is able to display/play related information to such service. The message comprises a text message or a multimedia message. The at least one electronic device is at least one of a computer, a audio file database, a wireless phone, an Internet Protocol (IP) enabled phone, a wireless IP-enabled phone, or a device that can receive and/or transmit information. The computer readable medium (or software) of the present disclosure is stored on and/or runs on at least one of the above-mentioned electronic devices.

Figure 1:
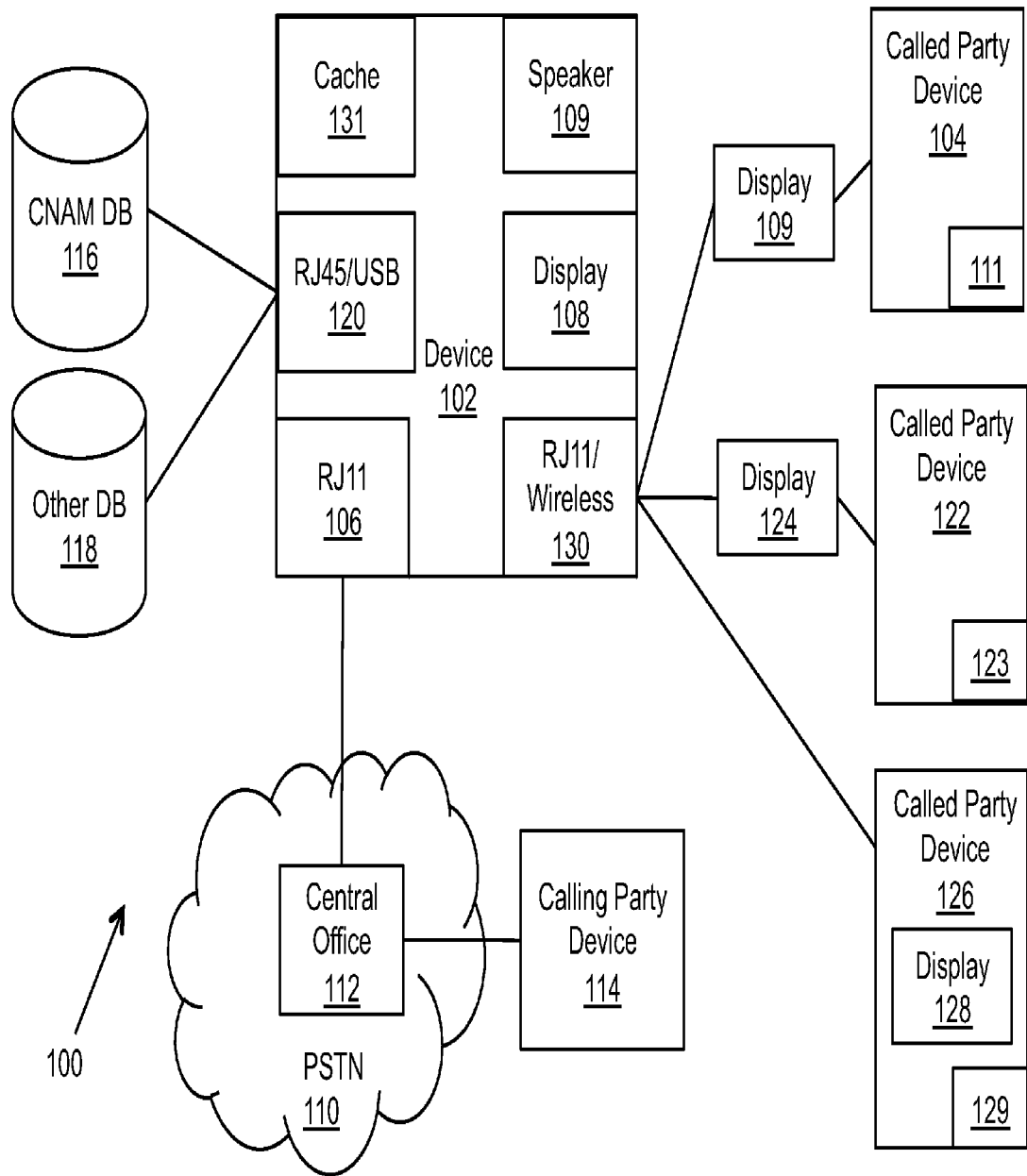
FIG. 1 depicts a system 100 for providing audio response in accordance with one embodiment of the present disclosure.

FIG. 1 depicts a system 100 for providing audio announcement of communications to a called party in accordance with one embodiment of the present disclosure. The system 100 includes a device 102, which is able to communicate with a called party device 104. The device 102 and the called party device 104 may communicate by calling or sending messages. The called party device 104 may be communicably coupled to device 102 via a wired connection or a wireless connection such as a land line telephone or a wireless device including but not limited to a cellular device, a Wi-Fi connection, a PDA, a Bluetooth, etc. The device 102 may be communicably coupled but not limited to a RJ 11 (telephone wire) communication address 106, 120, and/or a RJ11/wireless communication address 130. The device 102 can specify any communication address such as 106, 120, and 130 to receive information. The device 102 has a display 108 and a speaker 109 for presenting the information. In this embodiment, the display 108 and the speaker 109 are integrated within device 102. However, the display 108 and the speaker 109 may be implemented as a standalone device without departing from the spirit and scope of the present disclosure. Moreover, the device 102 may contain modules such as a headset jack or a Bluetooth to play audio. Further, the device 102 may be connected to one or more displays and/or speakers via a wired and/or wireless connection.

In addition, device 102 may receive information from a plurality of sources including but not limited to a communications network 110 such as a public switched telephone network (PSTN), a code division multiple access (CDMA), a global system for mobile communication (GSM). For example, a public switched telephone network (PSTN) that includes a central office 112 that is coupled to a calling party device 114. The information may be received through at least a RJ11 (telephone wire) communication address 106 of device 102. Other sources include a wireless network or data network (not shown) supporting other devices such as a computer or IP enabled phones.

Aspects of the present disclosure provide information to the called parties, such as the called party device 104, by providing an ability to retrieve information of a calling party from a CNAM database 116 and/or an other database 118. The CNAM database 116 and the other database 118 comprise information relating to the calling party, for example, calling party name, telephone number, messages, location, and other information associated with the calling party. In addition, the information relating to the calling party may be a city, a state, an address, a hyperlink, a photo, a video, and any information that can be sent via an Internet Protocol (IP) connection. The device 102 communicates with the CNAM database 116 and/or the other database 118 via an IP connection. The CNAM database 116 and the other database 118 comprise information relating to the calling party, for example, calling party name, telephone number, messages, location, and other information associated with the calling party. In addition, the information relating to the calling party may be a city, a state, an address, a hyperlink, a photo, a video, an announcement, a short film, one or more audio files and any information that can be sent via an Internet Protocol (IP) connection.

When a calling party communicates by calling or sending a message using the calling party device 114, the device 102 receives a caller ID, Automatic Number Identification (ANI) or other identifier from the calling party. An example of the identifier may include an IP address of the calling party device 114 or a unique identifier of the calling party that can be received and transmitted by the calling party device 114. The identifier may include information related to at least one of a calling party and a called party.

In response to receiving the caller ID, ANI or other identifier, the device 102 sends a query for the calling party name to the CNAM database 116 and/or the other database 118. The query may be sent via at least one communication address such as 106, 120, and 130 (the communication address may include but not limited to a wired communication and/or a wireless communication such as a cellular device, a Wi-Fi connection, a PDA, a Bluetooth connection, or the like) of the device 102 to the CNAM database 116 and/or the other database 118 via a direct connection or via a data network (not shown). Once the query is received, a lookup is performed in the CNAM database 116 and/or the other database 118 for the calling party name and other information. If the calling party name is found, the CNAM database 116 and/or the other database 118 returns the calling party name and other information associated with the calling party to the device 102. Thereafter, the device 102 may store the information associated with the calling party in cache 131. In an embodiment, the cache 131 may be implemented as a local storage on the device 102. Further, the information may be stored based on configurable parameters such as, but not limited to, a number of audio files, a time duration, size and so forth. Moreover, the cache 131 may not include any duplicate information or records. For example, the information may be maintained for a total of 100 non-duplicate audio files for names of calling parties. In an embodiment of the disclosure, the size of the cache 131 may be limited to a predefined limit. For example, the predefined limit may be 200 KB. Further, the cache 131 may be maintained on a rolling basis. For example, after the size of the cache 131 reaches the predefined limit, and when new information is received, then a previous or the earliest information in the cache 131 may be deleted.

The device 102 can maintain the cache 131 by adding, deleting or modifying information corresponding to a calling party or a called party. For example, the device 102 may delete audio files after a predefined number of days. Alternatively, the device 102 may allow a calling party or called party to modify or delete a file or clear data stored on the cache 131. Also, the device 102 ensures the integrity of the data stored in the cache 131. To maintain integrity, the device 102 may generate a key on the fly using attributes of the calling party/called party and encrypt the information including audio response with the key. Alternatively, the device 102 may include software that detects and prevents malicious attack and ensure data safety.

Therefore, when a new communication such as a call or a message is received, the device 102 checks the cache 131 to determine whether the calling party information is located in the cache 131. If the information is present in the cache 131, then the device 102 verifies the status of an indicator for audio announcement. The indicator can be set by a called party or configured by the device 102 to an active or an inactive state. In case the status of the indicator is active, for example, then the device 102 looks up for audio file included in information on the cache 131. Subsequently, audio announcement is played based on the audio file. For example, at least the name of the calling party may be announced as the audio. Otherwise, in case the indicator is inactive then the device 102 looks up for the information excluding the audio file in the cache 131. Thereafter, the information is displayed on the display 108 of the device 102.

In one embodiment of the disclosure, if the information is not available in the cache 131, then the device 102 verifies the status of an indicator. Thereafter, if the status of the indicator is active, then the device 102 sends a query, for example, with the calling party number or other identifier to the CNAM database 116 and/or the other database 118 for lookup of information including the audio file. The CNAM database 116 and/or the other database 118 return calling party information to the device 102 if the calling party name/number and corresponding audio file is found in the respective database. Thereafter, the audio announcement is played based on the audio file. In an embodiment of the disclosure, the audio file is streamed to the device 102 for playing the audio announcement. For example, the audio announcement may be played when the audio file is being downloaded and/or stored on the device 102. In another embodiment of the disclosure, the audio file is downloaded and stored in the cache 131. Therefore, the device 102 may not be required to connect to the CNAM database 116 and/or the other database 118 when the information is available in the cache 131. However, if the status of the indicator is set as inactive, then the device 102 looks up for the information excluding the audio file in the CNAM database 116 and/or the other database 118. Thereafter, the information is displayed on the display 108 of the device 102.

The device 102 may provide a playback preference to the called party for selecting a module for playback of the audio announcement. The modules include for example, but not limited to, a headset, a speaker or a Bluetooth device, such as an external device capable of playing audio through Bluetooth pairing. The device 102 captures the playback preference of a module for the called party. For example, the playback preference option may include language control/selection option from the service provider site 408 but the language control/selection option may further include the central office 112, the device 102, the calling party, and the called party. In another embodiment of the disclosure, the CNAM request can also include the language indicator to let the service provider site 408 and/or the central office 112 informs the spoken language to generate the audio file. Further, the device 102 may have a default module in case a module as selected by the user is not available. For example, the default module may be the speaker 109 of the device 102. Thereafter, the audio announcement may be played through the module. However, in case the selected module is not available then the default module may be selected for playback. For example, the called party device 104 may enable the audio response to be played over "Bluetooth" and over the ringer speaker with a ringer interrupt. Alternatively, the called party device 104 may enable the textual name to be displayed over "Bluetooth" to external displays such as in automobiles.

In addition to displaying/playing the information and audio response, device 102 may send the information to other user devices, such as called party devices 104, 122, and 126, to be contemporaneously displayed on displays 109, 124, and 128 respectively and played on their speakers 111, 123 and 129 respectively. In an embodiment, while the audio announcement is played, the audio announcement may refer to links that are displayed on the display 108. Further, the links displayed may be clickable. For this, a URL may be embedded with the information displayed on the display 108. Further, when the called party clicks the URL, a browser is launched with relevant information of the called party.

In this example, displays 109, 124, and 128 are implemented as standalone devices. In other embodiments, the displays 109, 124, and 128 or speakers 111, 123 and 129 can be communicably coupled to called party devices 104, 122, and 126 or may be integrated with called party devices 104, 122 and 126 without departing from the spirit and scope of the present disclosure. For example, display 128 may be integrated as part of the called party device 126 and the device 102 may send information directly to the called party device 126 to be displayed on display 128. The information may be sent from at least one communication address such as 106, 120, 130 of the device 102 or via wireless connection 130.

The information/audio response received at the device 102 may include number(s) that indicates the sender's phone number, as well as the sender's name, city, and/or state. In addition, the information/audio response includes for example alerts in response to an occurrence of an event, informative and promotional information from a service provider, and situational information from an emergency service provider. Furthermore, the information/audio response may include information relating to the calling party, such as an address, a hyperlink, a photo, a video, and any information that can be sent via an Internet Protocol connection.

Figure 2A:
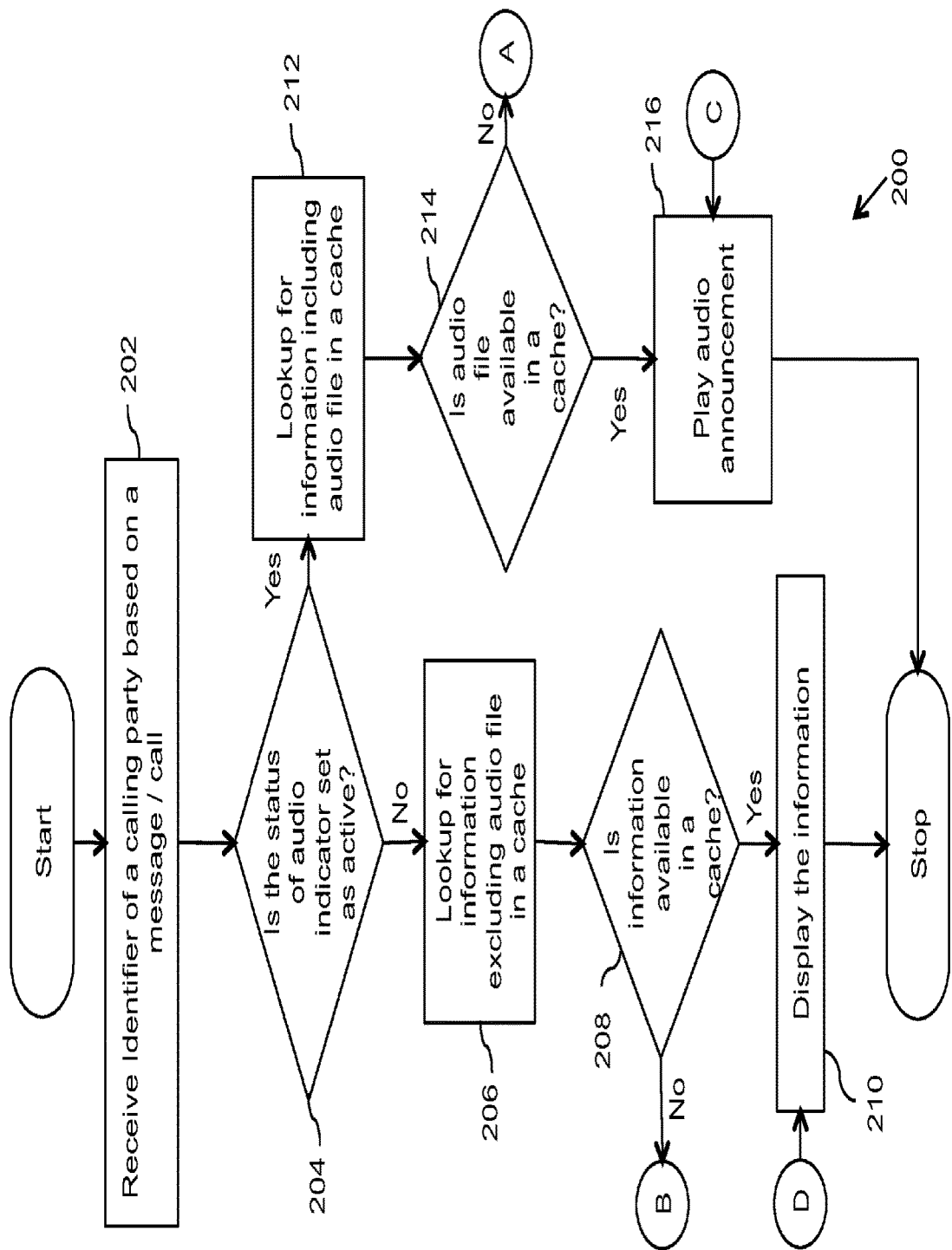

Referring to FIGS. 2A, 2B, and 2C, a flowchart of a method or computer readable medium comprising instructions for providing audio response to a called party is depicted in accordance with one embodiment of the present disclosure. In this example, process 200 may be implemented as instructions executed within the device 102. Process 200 begins at step 202 with receiving a caller ID or identifier of the calling party from a calling party device. The caller ID, ANI or other identifier may be received at least one communication address such as 106, 120, 130 of device 102. Thereafter, at step 204 it is determined if the status of an indicator for audio response is set as active. If the indicator is set to active, then the process continues to step 212, else if inactive, then the process continues to step 206.

At step 212, a lookup is performed in the cache 131 of the device 102 for the audio files corresponding to the identifier. Thereafter, at step 214 if the audio file is available in the cache 131 then the audio announcement is played at step 216. Otherwise, if the information or the audio files is not available, then the process 200 continues to step 218. At step 218, a lookup is performed in the CNAM database 116 and/or the other database 118. Subsequently, at step 220, the information is downloaded and stored in the cache 131. Further, the audio announcement is played based on the audio file at step 216. In an embodiment of the disclosure, the audio announcement is streamed or played while being downloaded. As a result, the waiting time for the download and then playing the file is reduced. In another embodiment of the disclosure, the audio file is downloaded on the device 102 and then the announcement is played.

As discussed above, if the audio indicator status is not set to active, then the lookup is performed in the cache 131 for information excluding the audio file. For example, the lookup may be performed for text data such as name of the called party, but excluding the audio file. The process 200 then continues to step 208, where it is determined whether the information is available in the cache 131. In case, the information is available then the information is displayed on the device 102 at step 210. Otherwise, the process continues to step 222, where the information is looked up excluding the audio file. Subsequently, the information is displayed at step 210. In an embodiment of the disclosure, the information displayed at step 210 is clickable. For example, the text displayed from the information can be clicked to open a browser for additional information.

Referring to FIG. 3, a flowchart of a process (which includes a method or computer readable medium comprising instructions) is depicted for playing audio announcement based on playback preference, in accordance with an embodiment of the present disclosure. Process 300 begins at step 302, where a playback preference of the user is determined. For example, the user may select a module from preferences such as a headset, a speaker a Bluetooth device and so forth. Thereafter, at step 304, it is determined whether the selected module based on the playback preference of the user is available.

In case, the selected module is available, then the audio announcement is played through the selected module at step 306. Otherwise, if the selected module is not available, then a default module is selected at step 308. For example, a default module may be the speaker of the device 102. Subsequently, the audio announcement is played through the default module at step 310.

Figure 4:
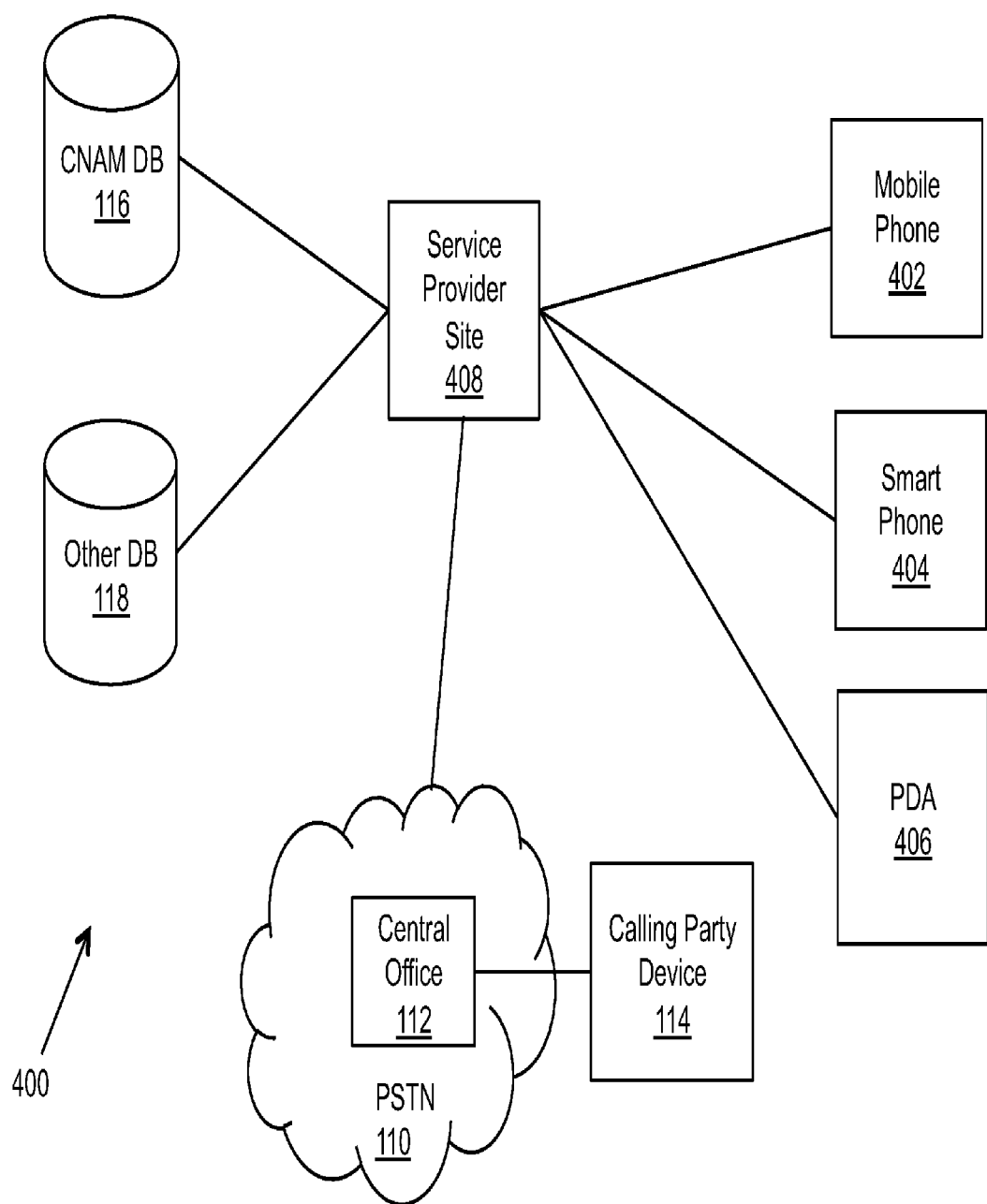
FIG. 4 depicts a system 400 for providing audio response to a wireless called party in accordance with one embodiment of the present disclosure.

Referring to FIG. 4, a system 400 providing audio response to a wireless called party in accordance with an alternative embodiment of the present disclosure. System 400 is similar to system 100 in FIG. 1, except that device 102 is implemented as a wireless communication enabled device. Device 102 is being implemented as a mobile phone 402, a smart phone 404, or a Personal Digital Assistant (PDA) 406. In an embodiment of the disclosure, the software of device 102 is implemented on called party devices such as the mobile phone 402, the smart phone 404, or the PDA 406. To send and receive information to and from the CNAM database 116 or other database 118, one or more of mobile devices 402, 404, and 406 can wirelessly communicate with a service provider site 408, which is also communicably coupled to the CNAM database 116 and the other databases 118 via a data network (not shown) and the calling party device(s) 114 via at least one communication network such as a public switched telephone network (PSTN) 110, a code division multiple access (CDMA), a global system for mobile communication (GSM). The calling party device 114 can be, but not limited to, a mobile phone, a smart phone, a PDA, a landline and so forth.

In one embodiment of the present disclosure, a calling party device 114 connects to a receiving party device such as a mobile phone 402, a smart phone 404, or a PDA 406. At least one of the receiving party devices includes software to obtain information based on the caller ID, ANI or other identifier. The receiving party devices such as 402, 404, and 406 may receive calling party 114 phone number via a service provider 408. The receiving party device, such as the mobile phone 402, retrieves the phone number through the software and sends it to the service provider 408 through internet connectivity including but not limited to FTP, HTTP, TELNET, etc. The service provider 408 may function as a web server, listening information and requests from the software. When the service provider 408 receives a request with calling party 114 phone number, it sends the request to at least the CNAM DB 116 for name or Message DB 132 for message. In another embodiment of the present disclosure, at least the calling party 114 name or other information is returned by at least the CNAM database 116, an audio file is generated based on at least the name from the CNAM database 116. The generated file may then be stored at least in the mobile phone 402 as a table for later matching at the name requests or other information. The information gathered from at least the 116 and 132 by the service provider 408 is sends to the receiving party device such as the mobile phone 402 (not shown).

In accordance with one embodiment of the present disclosure, aspects of the present disclosure are provided within the called party devices. Thus, when a calling party communicates by calling or sending a message using the calling party device 114, the calling party device such as mobile device 402 receives a caller ID, Automatic Number Identification (ANI) or other identifier from the calling party. An example of the identifier may include an IP address of the calling party device 114 or a unique identifier of the calling party that can be received and transmitted by the calling party device 114. The identifier may include information related to at least one of a calling party and a called party.

In response to receiving the caller ID, ANI or other identifier, the called party device 402 sends a query for the calling party name to the CNAM database 116 and/or the other database 118. The query may be sent wirelessly from the called party device 402 to the CNAM database 116 and/or the other database 118 via a direct connection or via a data network (not shown). Once the query is received, a lookup is performed in the CNAM database 116 and/or the other database 118 for the calling party name and other information. If the calling party name is found, the CNAM database 116 and/or the other database 118 returns the calling party name and other information associated with the calling party to the called party device 402. Thereafter, the called party device 402 may store the information associated with the calling party in cache 131. In an embodiment, the cache 131 may be implemented as a local storage on the called party device 402. Further, the information may be stored based on configurable parameters such as, but not limited to, a number of audio files, a time duration, size and so forth. Moreover, the cache 131 may not include any duplicate information or records. For example, the information may be maintained for a total of 100 non-duplicate audio files for names of calling parties. In an embodiment of the disclosure, the size of the cache 131 may be limited to a predefined limit. For example, the predefined limit may be 200 KB. Further, the cache 131 may be maintained on a rolling basis. For example, after the size of the cache 131 reaches the predefined limit, and when new information is received, then a previous or the earliest information in the cache 131 may be deleted.

The called party device 402 can maintain the cache 131 by adding, deleting or modifying information corresponding to a calling party or a called party. For example, the called party device 402 may delete audio files after a predefined number of days. Alternatively, the called party device 402 may allow a calling party or called party to modify or delete a file or clear data stored on the cache 131. Also, the called party device 402 ensures the integrity of the data stored in the cache 131. To maintain integrity, the called party device 402 may generate a key on the fly using attributes of the calling party/called party and encrypt the information including audio response with the key. Alternatively, the called party device 402 may include software that detects and prevents malicious attack and ensure data safety.

Therefore, when a new communication such as a call or a message is received, the called party device 402 checks the cache 131 to determine whether the calling party information is located in the cache 131. If the information is present in the cache 131, then the called party device 402 verifies the status of an indicator for audio announcement. The indicator can be set by a called party or configured by the called party device 402 to an active or an inactive state. In case the status of the indicator is active, for example, then the called party device 402 looks up for audio file included in information on the cache 131. Subsequently, audio announcement is played based on the audio file. For example, the name of the calling party may be announced as the audio. Otherwise, in case the indicator is inactive then the called party device 402 looks up for the information excluding the audio file in the cache 131. Thereafter, the information is displayed on the called party device 402.

In one embodiment of the disclosure, if the information is not available in the cache 131, then the called party device 402 verifies the status of an indicator. Thereafter, if the status of the indicator is active, then the called party device 402 sends a query, for example, with the calling party number or other identifier to the CNAM database 116 and/or the other database 118 for lookup of information including the audio file. The CNAM database 116 and/or the other database 118 return calling party information to the called party device 402 if the calling party name/number and corresponding audio file is found in the respective database. Thereafter, the audio announcement is played based on the audio file. In an embodiment of the disclosure, the audio file is streamed to the called party device 402 for playing the audio announcement. For example, the audio announcement may be played when the audio file is being downloaded and/or stored on the called party device 402. In another embodiment of the disclosure, the audio file is downloaded and stored in the cache 131. Therefore, the called party device 402 may not be required to connect to the CNAM database 116 and/or the other database 118 when the information is available in the cache 131. However, if the status of the indicator is set as inactive, then the called party device 402 looks up for the information excluding the audio file in the CNAM database 116 and/or the other database 118. Thereafter, the information is displayed on the called party device 402.

Figure 5A:
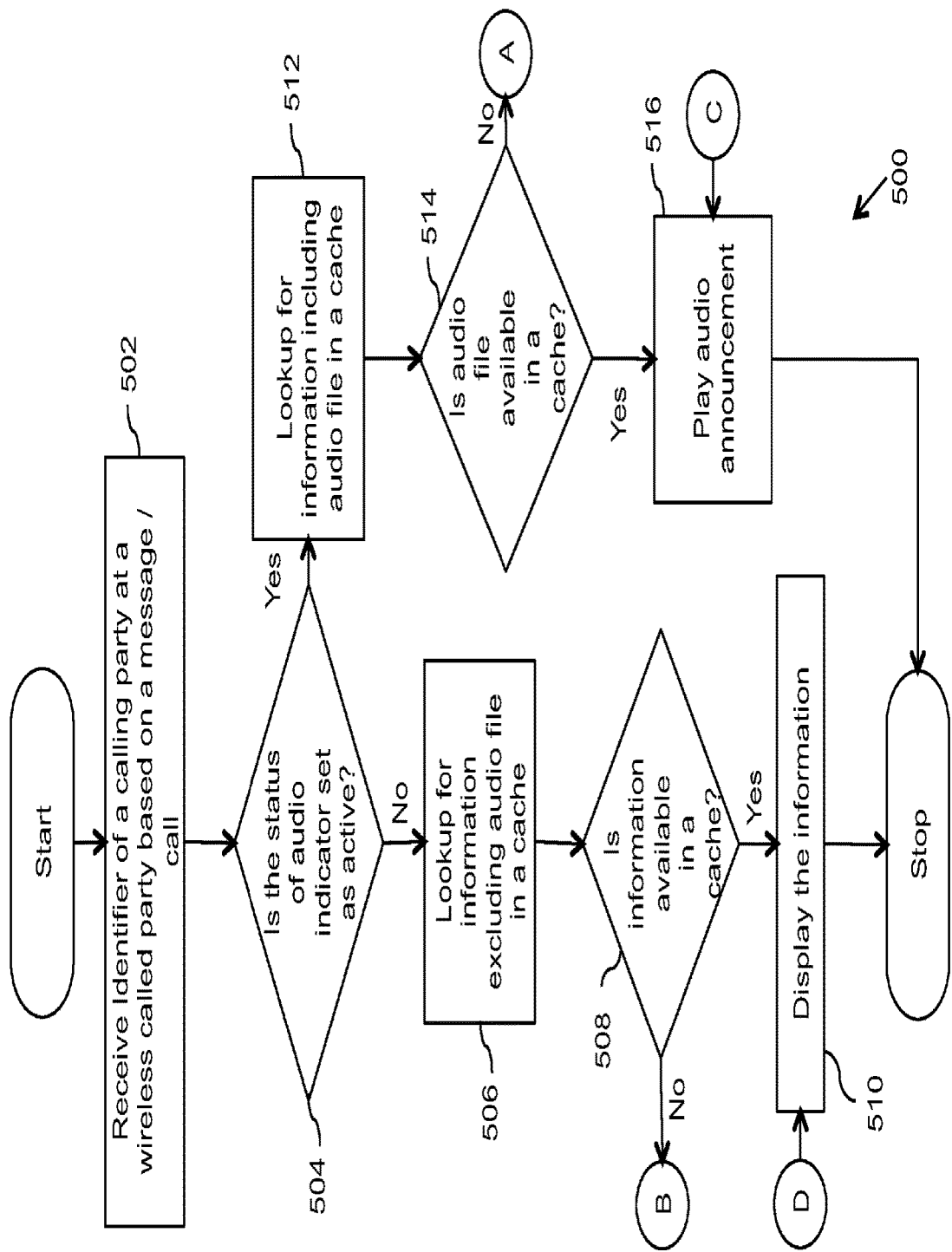

Referring to FIGS. 5A, 5B, and 5C, a flowchart of a method or computer readable medium comprising instructions for providing audio response to a wireless called party is depicted in accordance with one embodiment of the present disclosure. In this example, process 500 may be implemented as instructions executed within the called party device 402. Process 500 begins at step 502 with receiving a caller ID or identifier of the calling party from a calling party device. The caller ID, ANI or other identifier may be received wirelessly at the called party device 402. Thereafter, at step 504 it is determined if the status of an indicator for audio response is set as active. If the indicator is set to active, then the process continues to step 512, else if inactive, then the process continues to step 506.

At step 512, a lookup is performed in the cache 131 of the called party device 402 for the audio files corresponding to the identifier. Thereafter, at step 514 if the audio file is available in the cache 131 then the audio announcement is played at step 516. Otherwise, if the information or the audio files is not available, then the process 500 continues to step 518. At step 518, a lookup is performed in the CNAM database 116 and/or the other database 118. Subsequently, at step 520, the information is downloaded and stored in the cache 131. Further, the audio announcement is played based on the audio file at step 516. In an embodiment of the disclosure, the audio announcement is streamed or played while being downloaded. As a result, the waiting time for the download and then playing the file is reduced. In another embodiment of the disclosure, the audio file is downloaded on the called party device 402 and then the announcement is played.

As discussed above, if the audio indicator status is not set to active, then the lookup is performed in the cache 131 for information excluding the audio file. For example, the lookup may be performed for text data such as name of the called party, but excluding the audio file. The process 500 then continues to step 508, where it is determined whether the information is available in the cache 131. In case, the information is available then the information is displayed on the called party device 402 at step 510. Otherwise, the process continues to step 522, where the information is looked up excluding the audio file. Subsequently, the information is displayed at step 510. In an embodiment of the disclosure, the information displayed at step 510 is clickable. For example, the text displayed from the information can be clicked to open a browser for additional information.

Although an exemplary embodiment of the system, method, and computer readable medium of the present disclosure has been illustrated in the accompanied drawings and described in the foregoing detailed description, it will be understood that the disclosure is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide information delivery without departing from the spirit and scope of the present disclosure. Also, the device 102 may be a wireless mobile phone, a personal digital assistant, a cellular phone, an IP-enabled caller ID device, or a wired telephone that has IP communication capabilities. Further, the device 102 may include a memory (not shown) and a processor (not shown) to execute the process or the instructions. The memory may be for example, a Read Only Memory (ROM), a Random Access Memory (RAM), a disc media or any other computer readable medium comprising instruction executable by the processor. Although the device 102 is shown separate from the receiving party device 104, a person skilled in the art will appreciate that they can be co-located. Moreover, the receiving party device 104 may include all the functionalities of the device 102, without departing from the scope of this disclosure.

According to another example embodiment, a voice or audio file (e.g., a .wav, .aiff, .au or other file type) can be retrieved and activated during the operation of another mobile phone, computing device or wireless device function. For example, a user may access a web browser or email and select a link to an advertisement web page or other advertisement on their personal display. Alternatively, the advertisement may initiate automatically based on a first trigger operation. For example, a call may be received, an email may be received, a file or browser navigation operation may be detected, etc., and the advertisement may be initiated as a result of the trigger operation. Also, audio may be initiated based on a first trigger operation. The audio may include an audio advertisement, an audio announcement of a caller identification or other audio information which can be based on the recipient device location. As a result, a geolocation technique, such as GPS or triangulation, etc., may be used to modify a dialect of the voice recorded audio data (e.g., southern English, northern English, Canadian English, Hispanic English, or other language dialect, etc.), the addition of certain regional words or phrases, etc., can also be added to audio data received by the user device.

In operation, a user device can receive a voice message the first time an advertisement or any data is displayed on a user's display. Thereafter, further voice data updates may be provided without any further action from the user. For example, a user device may display an advertisement banner on a browser or other application. In one example, a grocery store advertisement may be displayed on a browser or application window and if a user engages with the advertisement, or if the advertisement simply pops-up automatically, then an audio message may be retrieved separately and played by the user device. At a later time in the same day, a different day, etc., another audio message and/or advertisement from the same grocery store may be sent to the user device indicating a 20% off limited offer on a perishable grocery item. Another example, may be an emergency service "advertisement" or "alert" which is displayed during inclement weather. If the user engages with the advertisement or if just pops-up automatically, then an audio message about a new alert regarding the weather/emergency event is played by the user device. In the same day, a different day, etc., another audio message and/or advertisement from the emergency services entity, which can be fire, police, ambulance, FEMA, etc., can be sent to the user device indicating further actions to take and/or information to be consumed by the end user of the user device.

In addition to or apart from the audio, a text message, email, etc. can be sent so the user can hear a tone and determine the type of message (i.e., a coupon, an emergency, etc.). As a result, the tone can imply some further information, such as what type of coupon, what type of emergency, or further information that is even unrelated to the original message content (e.g., an advertisement within an advertisement).

In selecting a content source, the user may click, select, perform a cursor roll-over operation, hover a mouse cursor for a predetermined amount of time, touch a touch screen device, use a hand or other body part to make a selection and/or speak to create an audible interaction with any content source, such as an advertisement, which may be a photo, video, web link, etc. At the point of any of these operations being performed, the audio content may be retrieved and "overlaid" with the data as a voice over type of function. Also, the audio may be retrieved and provided to the user after a certain portion of the data being consumed by the original source content has been identified. For example, a user may roll-over with a cursor on a banner advertisement's predefined window area on a display surface of a computing device. As a result of a 2, 3 . . . n second cursor roll-over operation, the first audio content may be provided to the user. Thereafter, the user preferences may be identified to determine whether subsequent audio content are acceptable. The user preferences may include a yes or no to subsequent audio content. Assuming the user has permitted such subsequent audio content to be received, the operation or process which provides the first audio may then setup a process that begins operating according to a specified amount of time.

In one example, a grocery store advertisement "such as a banner ad, rich media ad, social network ad, online classified ad, and the like" may be selected and a user may hear a list of items on sale as audio content at their nearest grocery store 'XYZ.' Later that same day, the user may receive a text message, email or additional audio notifications that the same store has just marked down all apples, seafood, or dairy with any purchase. Since the original content was accepted, the subsequent content was continually supplied for a predefined amount of time (e.g., 24 hours). A similar example may include a hurricane notification or emergency message. This may be especially important if a user goes to sleep and receives an audible indicator in the middle of the night that the "wind speeds are higher than expected, stay away from windows, consider staying in the basement." Such an audible message may alert the user to do something assuming a text message indicator was missed due to a sleeping user. Also, it is important to note that other data (e.g., text, images, video, links, etc.) can be presented with the audio or after the audio.

Figure 6:
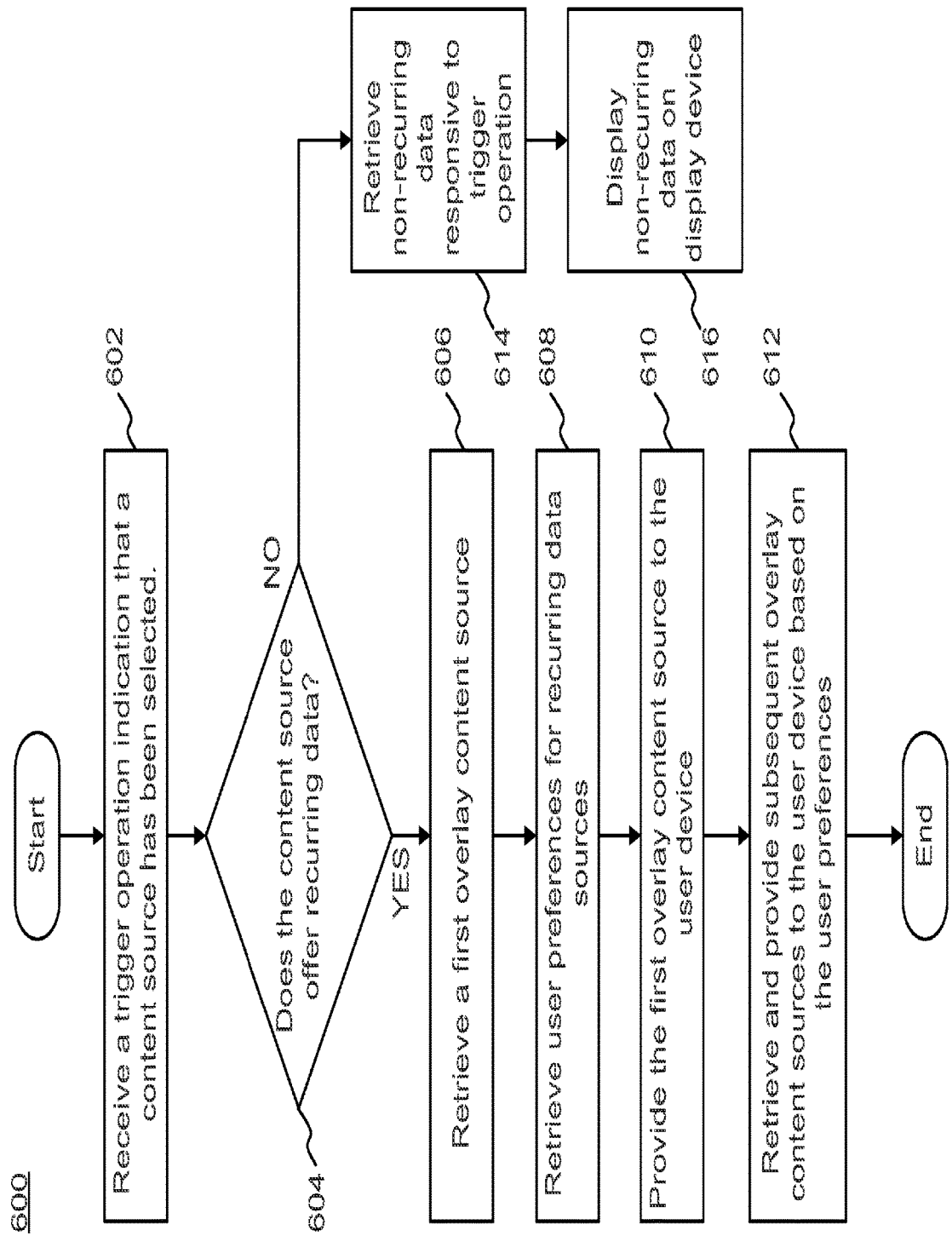
FIG. 6 illustrates an example flow chart method of operation according to other example embodiments.

FIG. 6 illustrates an example method of operation according to example embodiments. Referring to FIG. 6, the flow diagram 600 includes a first operation of receiving a trigger operation indication that a content source has been selected 602. The user may perform a roll-over operation and trigger the indication to be created and to launch the content source's active operations. A determination may then be made whether the content source offers recurring data at operation 604. If not, then non-recurring or one-time data may be retrieved responsive to the trigger operation at operation 614. The non-recurring data may then be displayed on the display device of the user device at operation 616. Assuming the user has elected to receive audio content, then the first set of audio data may then be provided to the user device at operation 606. Thereafter, user preferences may be retrieved from memory to identify the user's more specific preferences regarding subsequent audio data. For instance, the user may desire to receive audio data but only for certain types of information, such as coupons for stores, emergency alerts, other content types, etc. As a result, the subsequent audio may be subject to one or more restrictions identified by the user preferences and thus may not be permitted to be transmitted to the user device.

Figure 7:
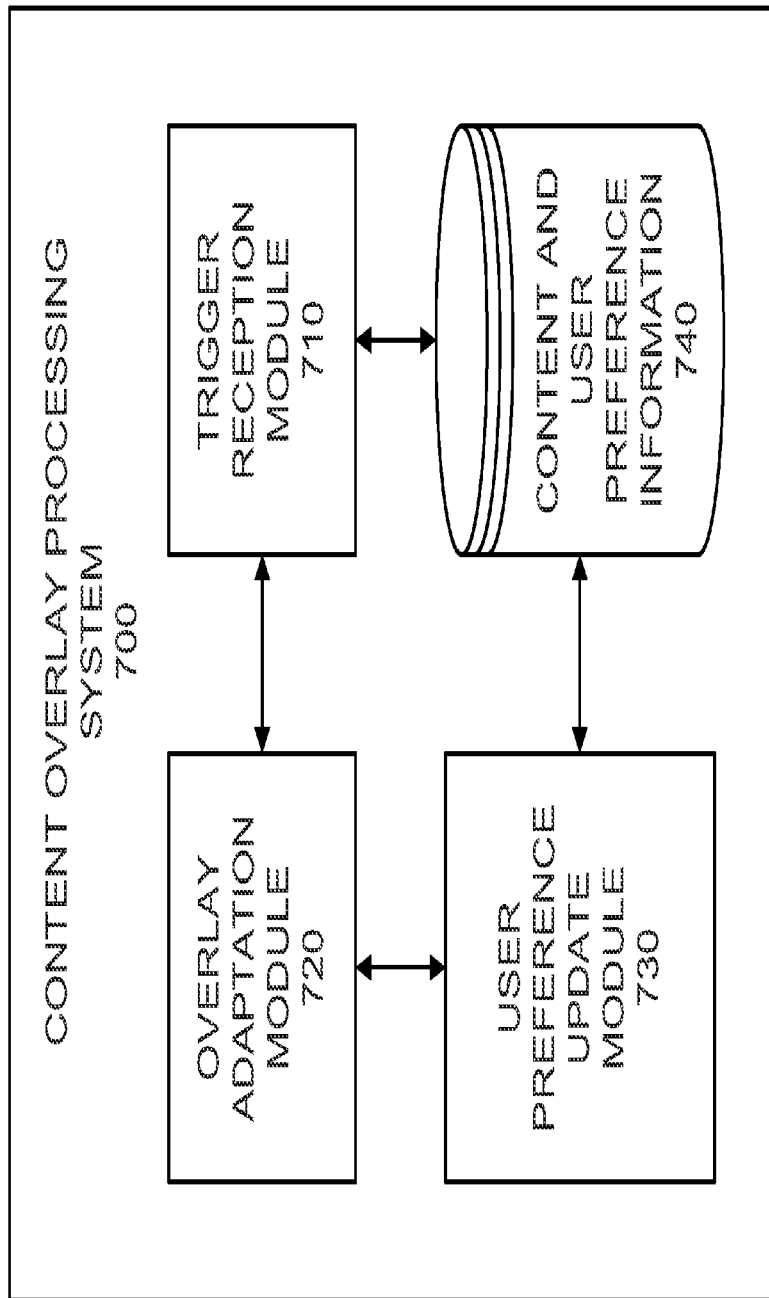
FIG. 7 illustrates an example system for performing one or more example processes according to example embodiments.

FIG. 7 illustrates an example system 700 according to example embodiments. In FIG. 7, the system 700 may be one device, such as a computer or server, or multiple devices operating as a single system. In one example of operation, the trigger reception module 710 may receive a trigger operation indication that a content source has been selected by a user device. In response, the content and user preference information databank 740 may reference pre-stored content source information and determine whether the content source offers a recurring audio content data. If so, the first audio content may be retrieved from memory 740 and transmitted as the first audio content to the user device via the adaptation module 720. Next, user preferences may be retrieved from memory 740 and the recurring audio content data may also be retrieved. The additional audio content data may be transmitted to the user device, and may be different from the first audio content data. Also, the subsequent or additional data may be delivered to the user device based on the user preferences stored in memory 740.

The trigger operation may include an advertisement selection operation, such as an item selection operation, a cursor roll-over operation, a touch screen input operation, and an audible input selection operation of a user speaking a command or making a voice based selection. Instead, the content source may be determined to not offer the recurring audio content data, and then non-recurring data may be retrieved responsive to the trigger operation and displayed on a display device of the user device. The user preferences for receiving the recurring audio content data may include preferences for predetermined content types including at least one of consumer advertisement data, emergency alert data, and local weather data.

The user preference data may include a fixed time interval during which multiple audio content data messages may be received. For example, the user may elect to receive notifications for 5, 10, 24, or 'n' hours. The additional audio content data may be based on a same content type as the first audio content data. For example, a first notification may be a coupon for store XYZ and subsequent content may be coupons for the same store or similar items. Any changes to the user preferences may be detected and updated by the user preference update module 730.

The embodiments of the disclosure are described above with reference to block diagrams and schematic illustrations of methods and systems according to embodiments of the disclosure. It will be understood that each block of the diagrams and combinations of blocks in the diagrams can be implemented by computer program instructions. These computer program instructions can be loaded onto one or more general purpose computers, or other programmable data processing apparatus to produce machines, such that the instructions which execute on the computers or other programmable data processing apparatus create means for implementing the functions specified in the block or blocks. Such computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks.

What is claimed is:

1. A method, comprising:
   receiving, from a user device, an indication of a trigger operation that includes a selection of an advertisement by the user device;
   retrieving audio content associated with the selected advertisement and overlaying the audio content with advertisement content by providing the audio content to the user device after a certain portion of the advertisement content has been consumed over a period of time since the selection of the advertisement; and
   transmitting additional audio content to the user device during a fixed time interval, wherein the additional audio content is recurring and comprises audio content identifying a same retailer identified in the audio content.

2. The method of claim 1, wherein the indication of the trigger operation indicates that a content source has been selected more than once by the user device.

3. The method of claim 1, wherein the trigger operation comprises an advertisement selection operation.

4. The method of claim 3, wherein the advertisement selection operation comprises an item selection operation, a cursor roll-over operation, a touch screen input operation, and an audible input selection operation.

5. The method of claim 1, wherein a user preference for receiving the additional audio content data include preferences for predetermined content types comprising at least one of consumer advertisement data, emergency alert data, and local weather data.

6. The method of claim 5, wherein the preferences further include a fixed time interval during which multiple audio content data messages may be received.

7. The method of claim 6, wherein the additional audio content data is based on a same content type as the non-duplicate audio content data.

8. An apparatus, comprising:
   a receiver configured to receive an indication of a trigger operation that includes a selection of an advertisement by the user device; and
   a processor configured to:
   retrieve audio content associated with the selected advertisement and overlay the audio content with advertisement content by the audio content being provided to the user device after a certain portion of the advertisement content has been consumed over a period of time since the selection of the advertisement; and
   transmit the recurring audio content to the user device during a fixed time interval, wherein the recurring audio content comprises audio content which identifies a same retailer identified in the audio content.

9. The apparatus of claim 1, wherein the indication of the trigger operation indicates that a content source has been selected more than once by the user device.

10. The apparatus of claim 8, wherein the trigger operation comprises an advertisement selection operation.

11. The apparatus of claim 10, wherein the advertisement selection operation comprises an item selection operation, a cursor roll-over operation, a touch screen input operation, and an audible input selection operation.

12. The apparatus of claim 8, wherein a user preferences for receiving the additional audio content data include preferences for predetermined content types comprising at least one of consumer advertisement data, emergency alert data, and local weather data.

13. The apparatus of claim 12, wherein the user preference data comprises a fixed time interval during which multiple audio content data messages may be received.

14. The apparatus of claim 13, wherein the additional audio content data is based on a same content type as the non-duplicate audio content data.

15. A non-transitory computer readable storage medium storing instructions that when executed by a processor cause the processor to perform:

receiving, from a user device, an indication of a trigger operation that includes a selection of an advertisement by the user device;

retrieving audio content associated with the selected advertisement and overlaying the audio content with advertisement content by providing the audio content to the user device after a certain portion of the advertisement content has been consumed over a period of time since the selection of the advertisement; and transmitting additional audio content to the user device during a fixed time interval, wherein the additional audio content is recurring and comprises audio content identifying a same retailer identified in the audio content.

16. The non-transitory computer readable storage medium of claim 15, wherein the indication of the trigger operation indicates that a content source has been selected more than once by the user device.

17. The non-transitory computer readable storage medium of claim 15, wherein the trigger operation comprises an advertisement selection operation.

18. The non-transitory computer readable storage medium of claim 17, wherein the advertisement selection operation comprises an item selection operation, a cursor roll-over operation, a touch screen input operation, and an audible input selection operation.

19. The non-transitory computer readable storage medium of claim 15, wherein a user preference for receiving the additional audio content data include preferences for predetermined content types comprising at least one of consumer advertisement data, emergency alert data, and local weather data.

20. The non-transitory computer readable storage medium of claim 19, wherein the user preference comprises a fixed time interval during which multiple audio content data messages may be received, and the additional audio content data is based on a same content type as the non-duplicate audio content data.

* * * * *